(12) United States Patent
Gay

(10) Patent No.: US 9,141,152 B2
(45) Date of Patent: Sep. 22, 2015

(54) INTERFACE CARD MOUNT

(75) Inventor: Raphael Gay, Fort Collins, CO (US)

(73) Assignee: Hewlett-Packard Devlopment Company, L.P., Houston, TX (US)

( * ) Notice: Subject to any disclaimer, the term of this patent is extended or adjusted under 35 U.S.C. 154(b) by 280 days.

(21) Appl. No.: 13/464,354

(22) Filed: May 4, 2012

(65) Prior Publication Data
US 2013/0294023 A1 Nov. 7, 2013

(51) Int. Cl.
*H05K 1/14* (2006.01)
*G06F 1/18* (2006.01)

(52) U.S. Cl.
CPC ...................... *G06F 1/187* (2013.01)

(58) Field of Classification Search
USPC .......................... 361/720, 760, 748
See application file for complete search history.

(56) References Cited

U.S. PATENT DOCUMENTS

| | | | |
|---|---|---|---|
| 4,860,194 A * | 8/1989 | Harrison et al. | ........... 360/98.01 |
| 5,793,617 A * | 8/1998 | Dent | ............................ 361/785 |
| 6,435,409 B1 | 8/2002 | Hu | |
| 6,738,260 B2 | 5/2004 | Siversten | |
| 6,884,085 B1 | 4/2005 | Goldstone | |
| 7,567,434 B1 * | 7/2009 | Sivertsen | ................. 361/679.32 |
| 8,432,684 B2 * | 4/2013 | Wu et al. | ................... 361/679.43 |
| 8,446,729 B2 * | 5/2013 | Schuette | ........................ 361/748 |
| 2007/0016704 A1 | 1/2007 | Harari et al. | |
| 2009/0164685 A1 * | 6/2009 | Chen et al. | ..................... 710/301 |
| 2010/0077117 A1 | 3/2010 | Asnaashari | |
| 2012/0033370 A1 * | 2/2012 | Reinke et al. | .............. 361/679.4 |
| 2013/0044424 A1 * | 2/2013 | Yin et al. | .................. 361/679.32 |

FOREIGN PATENT DOCUMENTS

CN 102129881 7/2011

OTHER PUBLICATIONS

Trout, "SATA-IO Outs New SATA Express and Embedded SSD Standards, Acronyms Abound," Aug. 10, 2011, 1 page.
Angel, J., Embedded Controller, (Web Page), Aug. 23, 2011. http://www.windowsfordevices.com/c/a/News/IEI-TANK101B/ >.
O'Brien, T., Magma Expressbox 3T Gives you 3 External3 Pcie Slots Over Thunderbolt, (Web Page), Sep. 7, 2011. http://www.engadget.com/2011/09/07/magma-expressbox-3t-gives-you-3-external-pcie-slots-over-t.
Sil3132—PCI Express (1x) to 2 Port SATA300, (Web Page), 2011. http://www.siliconimage.com/products/product.aspx?id=32 >.

* cited by examiner

*Primary Examiner* — Hung S Bui
(74) *Attorney, Agent, or Firm* — Brooks, Cameron & Huebsch, PLLC

(57) ABSTRACT

Interface card mounts to storage device connections, systems and methods are provided. An example of the interface card mount to storage device connection includes a PCI-Express card having an edge connector, a mounting bracket on the PCI-Express card to releasably receive a memory storage device, and lanes between the edge connector and the mounting bracket that provide, in addition to PCI-Express slot signals, side-band signals and power from a motherboard to the mounting bracket for the memory storage device.

14 Claims, 4 Drawing Sheets

INTERFACE CARD MOUNT

BACKGROUND

Peripheral Component Interconnect (PCI)-Express is a computer expansion bus that allows add-in boards to be added to a computer. The PCI-Express provides for a motherboard-level interconnect between integrated-peripherals (e.g., integrated circuit(s)) and add-on peripherals (e.g., expansion cards). The PCI-Express provides full-duplex communication between combinations of the integrated-peripherals and/ or the add-on peripherals.

Serial advanced technology attachment (SATA) is also a computer bus interface. SATA connects host bus adapters to mass storage devices (e.g., hard disks). A high-speed serial cable is used in communicating between the host bus adapter and the mass storage device. SATA-Express is a mode of operation building upon SATA protocol and with an interface definition (e.g., signals, pinout, etc.) that builds upon the SATA interface, and provides support for PCI-Express signaling and multiple lanes for higher bandwidth. For example, SATA is a single lane configuration whereas SATA-Express can include at least two lanes, e.g., is a multiple lane configuration for higher bandwidth. As used herein lanes are communication paths for electrical signaling such as electrical traces printed on a card or printed circuit board.

DETAILED DESCRIPTION

Figure 1:
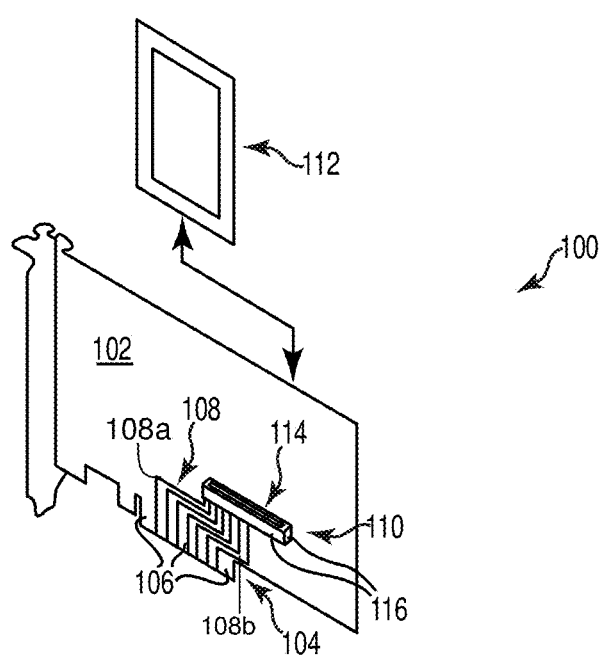
FIG. 1 illustrates a perspective view of an example of an interface card mount embodiment according to the present disclosure.

Interface Card Mounts to storage device connections, systems and methods are provided. An example of an interface card mount to storage device connection includes a PCI-Express card mount having an edge connector, a mounting bracket on the PCI-Express card to releasably receive a memory storage device, and lanes between the edge connector and the mounting bracket that provide, in addition to PCI-Express slot signals, side-band signals, e.g., reset, devslp, InterfaceDet, etc., and power from a motherboard to the mounting bracket for the memory storage device.

An example of a system embodiment includes a motherboard having a PCI-Express slot to receive a PCI-Express card mount. In one example embodiment the system includes the ability to switch between a PCI-Express mode and a SATA-Express mode. In one example the system includes a SATA-Express storage device. The PCI-Express card joins the motherboard and the SATA-Express storage device. The PCI-Express card mount includes a PCI-Express card with an edge connector, a mounting bracket on the PCI-Express card to releasably receive the SATA-Express storage device. Lanes between the edge connector of the PCI-Express card mount and the mounting bracket allow pin connectors of the motherboard to provide, in addition to PCI-Express slot signals (e.g., data lanes, PCIRST#, CLKREQ#, etc.), power from the motherboard, and SATA-Express side-band signals and power generated or managed locally on the card (e.g., InterfaceDet, 5v generation from PCI-Express's 12V, DAS/DSS, etc.), to a mounting bracket for a SATA-Express storage device.

The method, for example, includes providing the mounting bracket on the PCI-Express card having the edge connector, where the mounting bracket releasably receives a memory storage device, and providing lanes on the PCI-Express card for PCI-Express slot signals, side-band signals (e.g., reset, devslp, InterfaceDet, etc.) and power from a motherboard through the edge connector to the mounting bracket for the SATA-Express storage device to accommodate a SATA-Express protocol and a PCI-Express protocol.

The present disclosure provides for, among other things, support for a SATA-Express device on a PCI-Express interface. This support does not need a cable infrastructure, as currently proposed with SATA-Express. The present disclosure takes advantage of the volume, e.g., real estate or space available, and power served for the PCI-Express interface in a computer's implementation to increase expandability in that computer system. As such, the interface card mount, the system and method of the present disclosure may utilize the PCI-Express interface while providing new compatibility with SATA-Express applications.

In the following detailed description of the present disclosure, reference is made to the accompanying drawings that form a part hereof, and in which is shown by way of illustration how some examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 104 may reference element "02" in FIG. 1A, and a similar element may be referenced as 204 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates a perspective view of an example of an interface card mount 100. The interface card mount 100 includes a PCI-Express card 102 having an edge connector 104. The edge connector 104 includes pads 106 that are joined to lanes 108 (e.q., power lanes 108a, and signal lanes 108b) on the PCI-Express card 102. The pads 106 and the lanes 108 allow electrical signals (e.g., data, power, PCI Express side-band signals) to be transmitted and/ or received along the PCI-Express card 102, as discussed herein.

The PCI-Express card 102 can be a printed circuit board, among other types of circuit boards. Examples of such printed circuit boards include an adapter card, which may also be referred to as a mezzanine card, or a daughter card, among other references.

The interface card mount 100 can be implemented in a computer or other computerized device that includes a motherboard, where the interface card mount 100 and motherboard connect together by way of a connector assembly that facilitates the connecting or installation of the interface card mount 100 with respect to the motherboard. When implemented in the computer, the interface card mount 100 can provide data processing, data storage, signal conversion, system control functions, and/or network connection functions, among other computing functions.

The PCI-Express card 102 includes a mounting bracket 110. The mounting bracket 110 can releasably receive a SATA-Express storage device 112. To releasably receive the SATA-Express storage device 112, the mounting bracket 110 can include a slot 114 having pins that are electrically connected to the lanes 108 of PCI-Express card 102. The slot 114 is defined by sidewalls 116 and is configured to releasably receive the SATA-Express storage device 112. The pins of the mounting bracket 110 can electrically couple (e.g., make electrical contact) with the electrical connectors (e.g., contact pads) of the memory storage device 112 when the SATA-Express storage device 112 is inserted into the mounting bracket 110.

The lanes 108 extend between the pads on the edge connector 104 and the pins of the mounting bracket 110. The lanes 108 may be dual capable. As used herein, the lanes 108 provide electrical connection and a signal path that can transmit and/or receive data between a motherboard and the memory storage device 112 mounted in the mounting bracket 110.

In a one example, the lanes 108 may provide PCI-Express slot signals to the mounting bracket 110. The lanes 108 may also accommodate, besides other things, side-band signals and power from a motherboard, some local to the PCI-Express card, and power, to the mounting bracket 110 for a memory storage device 112. Examples of the side-band signals include, but are not limited to, PCIRST#, CLKREQ#/DEVSLP, DAS/DSS, 12V, 5V, InterfaceDet, among others for the SATA-Express interface. As such, the lanes 108 may be assigned to accommodate a SATA-Express mode of operation, while the lanes 108 allow for the mounting bracket 110 to be a SATA-Express connector that can releasably receive a SATA-Express device.

As illustrated in the example embodiment of FIG. 1, the interface card mount 100 does not include a SATA-Express cable (e.g., SATA-Express power cable). That is the present disclosure describes a method to support a SATA-Express device on PCI-Express slots without the need for a cable infrastructure.

The mounting bracket 110 is physically secured to the PCI-Express card 102. Examples of physically securing the mounting bracket 110 to the PCI-Express card 102 can include, but are not limited to, the use of mechanical fasteners (e.g., rivets, screws, solder) and/or chemical fasteners (e.g., two-part epoxy resin systems, sonic welding). Other means for securing the mounting bracket 110 to the PCI-Express card 102 are also possible.

While FIG. 1 shows one of the mounting bracket 110 on the PCI-Express card 102, more than one mounting bracket 110, along with lanes 108, may be present on the PCI-Express card 102 (e.g., a first mounting bracket 110-1, a second mounting bracket 110-2, a third mounting bracket 110-3, etc.). In other approaches, SATA-Express ports can be implemented directly on a motherboard to provide support, through a SATA-Express cable, for SATA-Express devices in the computer system.

Figure 2:
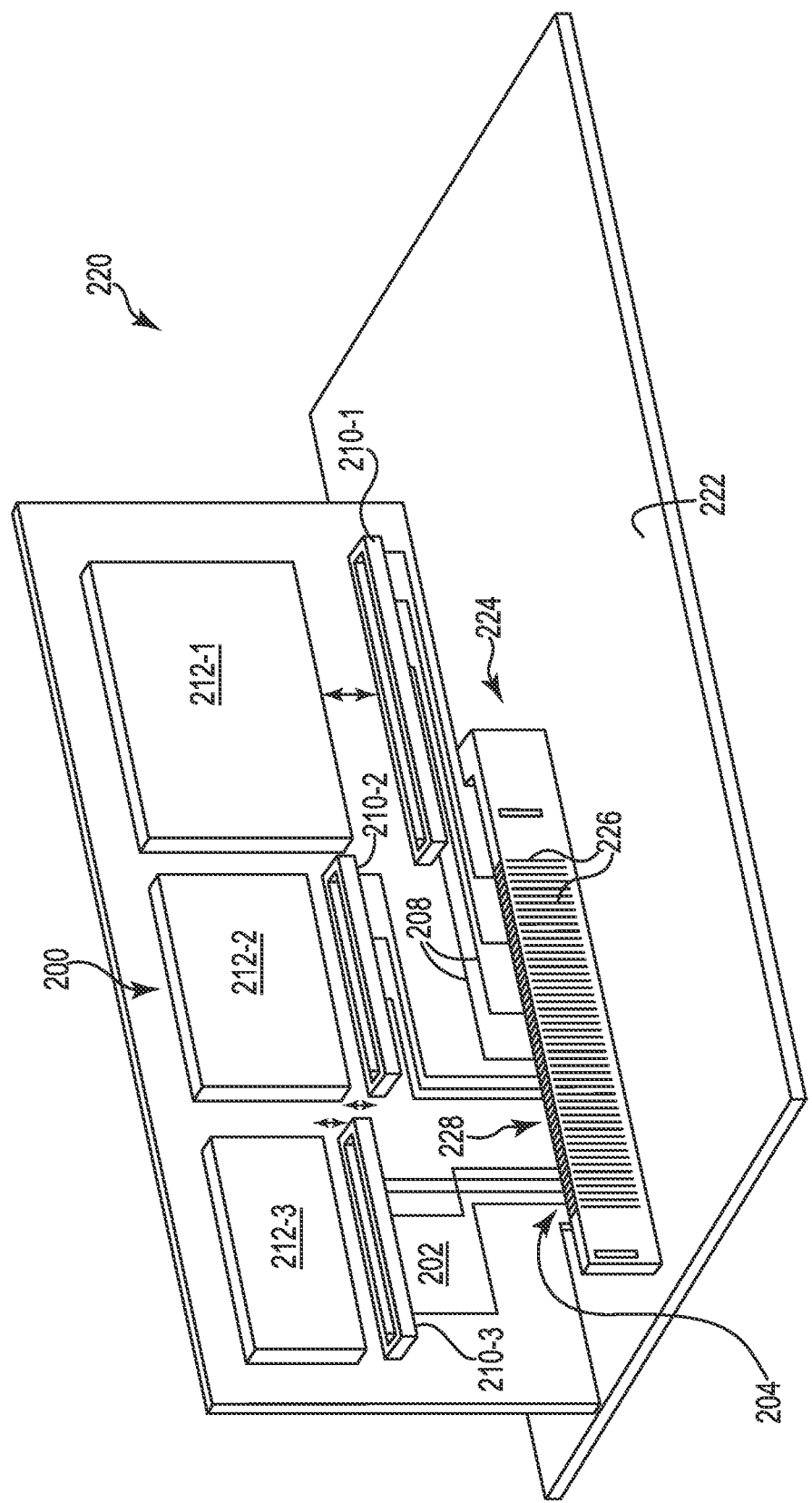
FIG. 2 illustrates a perspective view of an example of a system embodiment that includes the interface card mount according to the present disclosure.

FIG. 2 illustrates a perspective view of an example of a system 220 embodiment according to the present disclosure. The system 220 includes a motherboard 222 having a connector assembly 224 with pin connectors 226. The motherboard 222, which may also be referred to as a mainboard, system board, or a planar board, among other references, can be a printed circuit board, among other types of circuit boards. For example, the present disclosure provides that the system 220 can be located within a computing chassis.

The connector assembly 224 facilitates connecting or installing the interface card mount 200 on the motherboard 222. The connector assembly 224 includes surfaces defining a slot 228 that can receive the edge connector 204 of the interface card mount 200. Once seated in the slot 228, the pin connectors 226 of the connector assembly 224 are able to come into contact with the pads positioned on the edge connector 204 of the PCI-Express card 202, thereby electrically coupling the interface card mount to the motherboard 222. As discussed herein, the pads positioned on the edge connector 204 are joined to the lanes 208 on the PCI-Express card 202 to allow electrical signals (e.g., side-band signals, data and/or power) to be transmitted and/or received at the pins of a mounting bracket 210, as discussed herein.

The interface card mount 200 can physically and electrically join the motherboard 222 and a memory storage device, e.g., 112 in FIG. 1 and 212 in FIG. 2. The interface card mount 200, shown in FIG. 2, has the PCI-Express card 202 with the edge connector 204, a number of mounting brackets, e.g., 210-1, 210-2 and 210-3, on the PCI-Express card 202 to releasably receive a number of SATA-Express devices, e.g., 212-1, 212-2 and 212-3. In at least one embodiment, the interface card mount 200 can include two or more of the mounting brackets 210-1, 210-2, 210-3 on the PCI-Express card 202, where each of the mounting brackets 210-1, 210-2, 210-3 releasably receives a SATA-Express storage device, e.g., 212-1, 212-2, 212-3. However, embodiments are not limited to a particular number of mounting brackets or storage devices. In this example, the lanes 208 between the edge connector 204 and each of the two or more mounting bracket 210-1, 210-2, 210-3 provide, in addition to PCI-Express slot signals, the side-band signals, as provided herein, and power from the motherboard 222 to the mounting brackets 210-1, 210-2, 210-3 for each of the memory storage devices 212-1, 212-2, 212-3.

The motherboard 222 has lanes that are dual capable and can accommodate a SATA-Express mode of operation and a PCI-Express mode of operation (e.g., can accommodate SATA-Express and PCI-Express protocols and electrical modes of operation or specifications). That is, the slot 228 can be a PCI-Express slot and the PCI-Express card 202 connects PCI-Express slot signals received at slot 228 to the mounting bracket 210-1, 210-2, 210-3. As discussed herein, the mounting bracket 210 can be a SATA-Express connector and the memory storage device can be a SATA-Express device.

In order to accommodate the SATA-Express mode of operation and the PCI-Express mode of operation, the lanes 208 between the pads 206 of the edge connector 204 and the mounting bracket 210-1, 210-2, 210-3 can align to the pin connectors 226 of the motherboard 222 to provide, in addition to PCI-Express slot signals, side-band signals (e.g., reset, devslp, IntefaceDet, etc.) and power from the motherboard 222, to the mounting bracket 210-1, 210-2, 210-3 for the memory storage device 212-1, 212-2, 212-3. In one example, one or more of the side band signals are received from the motherboard. In another example, one or more of the side band signals can be received from memory storage devices 212-1, 212-2, 212-3. This configuration allows the mounting brackets 210-1, 210-2, 210-3 to support SATA-Express devices on a PCI-Express slot without the need for a cable infrastructure (e.g., the interface card mount 200 does not include a SATA-Express cable). The interface card mount 200 takes advantage of the PCI-Express slot volume, e.g., available space, and power budgets to increase expandability in a computer and support additional storage devices, e.g., 212-1, 212-2 and 212-3.

Lanes 208 are utilized based on a SATA-Express mode of operation. Further, as described more below, the motherboard 222 is provided with the capability to toggle between the mode of operations (SATA-Express and/or PCI-Express) being implemented on the interface card mount 200. Therefore, in some embodiments, the present disclosure can support a SATA-Express device on a PCI-Express slot without the need for the SATA-Express cable. The PCI-Express card 202 connects the signals from the slot 228 on the motherboard 222 (e.g., PCI-Express slot signals) to the mounting brackets 210-1, 210-2, 210-3 (e.g., a SATA-Express connector for support of the SATA-Express device). To achieve the SATA-express mode of operation, the PCI-Express card 202 includes lanes for sideband signals (e.g., reset, devslp, Inteface Det, etc.) and power, in addition to PCI-Express lanes, to the SATA-Express connector.

To ensure selection of the proper mode of operation, PCI-Express or SATA-Express, by the motherboard 222, the motherboard is provided with a detection mechanism and uses a detection method. The detection method can be performed by a firmware of the motherboard or with a strapping function to identify which type of card, i.e., PCI-Express or the SATA-Express interface card described herein, is present in each PCI-Express slot 228 on the motherboard 222. Upon identification, the motherboard's PCI-Express controller is then configured for the proper mode for each slot 228, i.e., in SATA-Express mode if appropriate and if supported by the motherboard's PCI-Express controller on the corresponding slot and its associated PCI-Express bus.

The identification of the type of card inserted in a PCI-Express slot can be done in several ways. One way includes using the I2C bus pins on the PCI-Express slot 228 to access an I2C device, e.g., eeprom, on the SATA-Express capable card 202 that identifies it as such. Other techniques include repurposing some of the reserved pins of a PCI-Express slot 228. The type of detection mechanism is open to specific implementation practices and objectives.

The configuration of the motherboard 222 to the proper mode of operation, i.e. PCI-Express or SATA-Express, for a given slot, can be performed by the firmware, e.g., BIOS, of the platform that is in charge of configuring the PCI-Express controller. If the PCI-Express controller supports dual operation, i.e., SATA-Express, on selected slots and if a SATA-Express interface card be present on a slot that does not support SATA-Express, then that slot will be configured as inactive. That is, the PCI-Express controller will not attempt to initialize the corresponding bus, lanes and signals.

Figure 3:
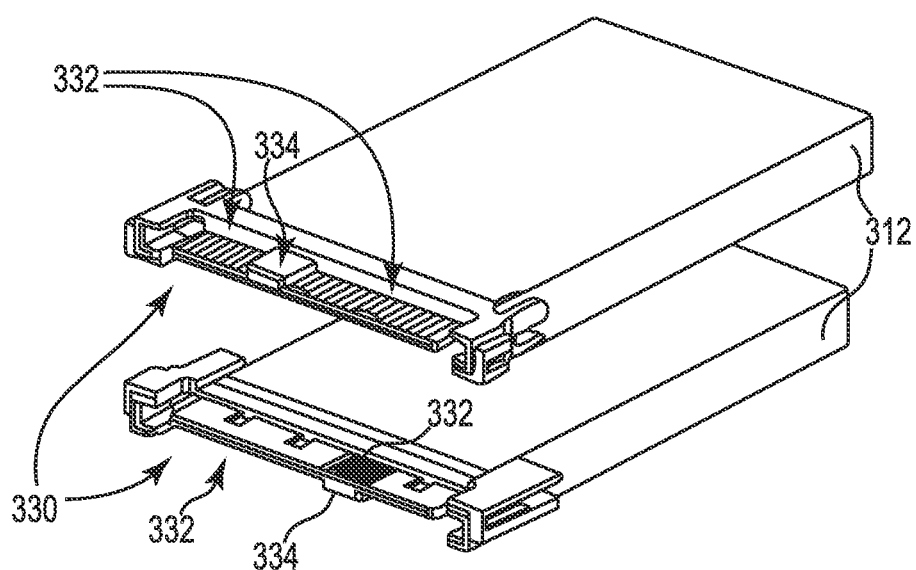
FIG. 3 illustrates a perspective view of an example of a connector for a SATA-Express device according to the present disclosure.

FIG. 3 provides a perspective view of a connector 330 for a memory storage device 312, e.g., a SATA-Express device, that can be used with the interface card mount embodiments described herein, e.g., 100 in FIG. 1 and 200 in FIG. 2. Front and back perspective views of a memory storage device 312, e.g., SATA-Express device, are shown in FIG. 3 to illustrate at least one example of the relative positions of the connector pins 332 for the memory storage device 312.

In the example connector 330 embodiment shown in FIG. 3, the connector pins 332 for the memory storage device 312 can accommodate the SATA-Express mode of operation. The example connector 330 embodiment illustrates a zone 334 of the connector pins 332 for the SATA-Express storage device 312 which are assigned to have SATA-Express functionality. As such, the pinout including zone 334 is forward compatible with SATA-Express applications. When inserted in a SATA-Express environment, according to embodiments of the present disclosure, the pins 332 will switch to the SATA-Express mode/definition, e.g., the pins in zone 334 will be functional.

In one embodiment, regardless of the final connector 330 form factor, at least two additional signals are provided, either from zone 334 and/or pins 332 described above. The at least two additional signals will involve two available PCI-Express signals, one for PCI-Express reset PCIRST#, and one for PCI-Express CLKREQ#. These are available through the PCI-Express slot, e.g., 224 in FIG. 2. Embodiments take advantage of this availability to support SATA-Express devices directly connected to the PCI-Express bus through their mounting on and connection to a PCI-Express card, when complemented with local 5V power generation (off of PCI-Express's 12V), as described herein.

Figure 4:
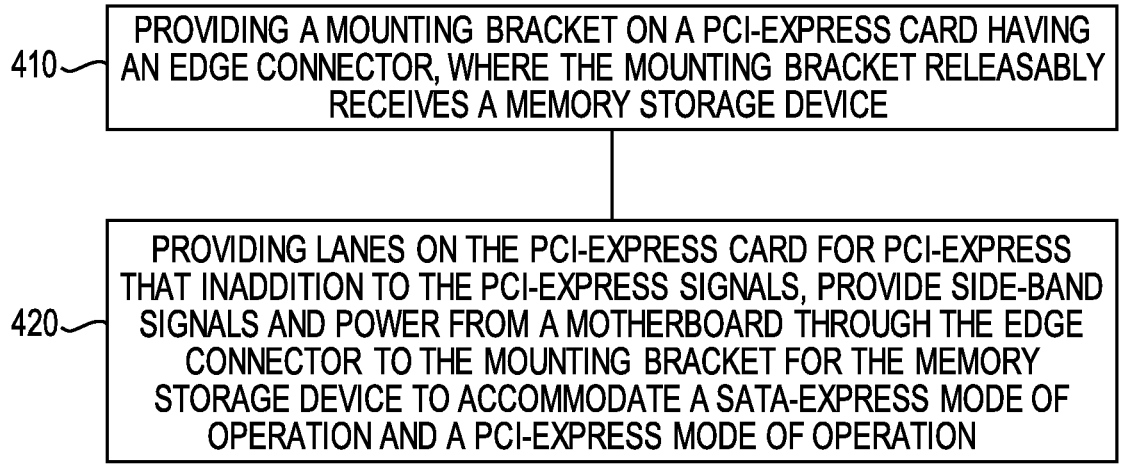
FIG. 4 illustrates a flow diagram for a method embodiment according to the present disclosure.

FIG. 4 illustrates a flow diagram for a method embodiment according to the present disclosure. As shown in block 410 one method includes providing a mounting bracket (e.g., 110 in FIG. 1 and 210 in FIG. 2) on a PCI-Express card (102 in FIG. 1 and 202 in FIG. 2) having an edge connector (104 in FIG. 1 and 204 in FIG. 2). The mounting bracket releasably receives a memory storage device, e.g., SATA-Express storage device (112 in FIG. 1 and 212-1, 212-2, 212-3 in FIG. 2).

At block 420, the method includes providing lanes on the PCI-Express card for PCI-Express that in addition to the PCI-Express signals, provide side-band signals and power from a motherboard through the edge connector to the mounting bracket for the memory storage device to accommodate a SATA-Express mode of operation (e.g., protocol and signaling) and a PCI-Express mode of operation (e.g., protocol and signaling).

In at least one embodiment two additional signals are provided. As mentioned above, the at least two additional signals include two available PCI-Express signals, one for PCI-Express reset PCIRST#, and one for PCI-Express CLKREQ#. The method further includes providing a detection mechanism on the motherboard to detect whether the PCI-Express card is a normal PCI-Express card or a SATA-Express interface card. The SATA-Express interface card is provided with a reporting mechanism to communicate to the detection mechanism on the motherboard the presence of the SATA-Express interface card. The motherboard is provided with firmware or a strapping module to toggle between a SATA-Express mode of operation and a PCI-Express mode of operation.

As discussed, the memory storage device (112, 212) can be a SATA-Express device. The method can include releasably mount the SATA-Express device on the mounting bracket (110, 210) so as to use PCI-Express slot lanes on the PCI-Express card (102, 202) for SATA-Express applications with the SATA-Express device. The motherboard (222) is configured in such a way that it can be directed to toggle between the SATA-Express mode of operation and the PCI-Express mode of operation per the type of card coupled to the PCI-Express slot.

Although specific examples have been illustrated and described herein, those of ordinary skill in the art will appreciate that an arrangement calculated to achieve the same results can be substituted for the specific embodiments shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the examples of the present disclosure includes other applications in which the above structures are used. Therefore, the scope of examples of the present disclosure should be determined with reference to the appended claims, along with the full range of equivalents to which such claims are entitled.

In the foregoing Detailed Description, some features are grouped together in a single example for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

What is claimed:

1. An interface card mount comprising:
   a PCI-Express card having an edge connector;
   a mounting bracket on the PCI-Express card to releasably receive a memory storage device being a SATA-Express device;
   one or more PCI-Express lanes provided between the edge connector and the mounting bracket to transmit PCI-Express slot signals;
   one or more side-band lanes, specific to the memory device, provided between the edge connector and the mounting bracket to transmit side-band signals directly to the memory storage device; and
   one or more power lanes provided between the edge connector and the mounting bracket to transmit power from a motherboard to the memory storage device,
   wherein the motherboard includes (i) a detection mechanism to detect whether the mounting bracket has received the SATA-Express device, and (ii) firmware or a strapping module to toggle between a SATA-Express mode of operation and a PCI-Express mode of operation depending on an input from the detection mechanism.

2. The card mount of claim 1, wherein the mounting bracket is a SATA-Express connector.

3. The card mount of claim 2, wherein the interface card mount does not include a SATA-Express cable.

4. The card mount of claim 2, wherein the one or more side-band lanes include at least one forward compatible lane specific to the SATA-Express mode of operation, and wherein the detection mechanism is to detect whether the mounting bracket has received the SATA-Express device by determining that one or more connector pins are coupled to the at least one forward compatible lane.

5. The card mount of claim 1, further comprising:
   one or more additional mounting brackets each capable of releasably receiving a memory storage device.

6. A system comprising:
   a motherboard having a PCI-Express slot, the motherboard including a detection mechanism to switch between a PCI-Express mode and a SATA-Express mode; and
   an interface card mount comprising:
      a PCI-Express card with an edge connector coupled to the PCI-Express slot;
      a mounting bracket to releasably receive a SATA-Express storage device, wherein receiving the SATA-Express storage device is detected by the detection mechanism to cause the motherboard to switch from the PCI-Express mode to the SATA-Express mode;
   wherein the PCI-Express card includes:
      one or more PCI-Express lanes to transmit PCI-Express slot signals;
      one or more side-band lanes to transmit side-band signals from the motherboard directly to the mounting bracket for the SATA-Express storage device; and
      one or more power lanes to transmit power from the motherboard to the mounting bracket for the SATA-Express storage device.

7. The system of claim 6, wherein the mounting bracket is a SATA-Express connector.

8. The system of claim 7, wherein the one or more side-band lanes include one or more forward compatible lanes specific to one or more connector pins of the SATA-Express storage device, and wherein the detection mechanism is to detect whether the mounting bracket has received the SATA-Express storage device by determining that the one or more connector pins of the SATA-Express storage device are coupled to the one or more forward compatible lanes.

9. The system of claim 6, wherein the interface card mount does not include a SATA-Express cable.

10. A method for operating a motherboard of a computing system, the method being performed by a motherboard controller of the computing system and comprising:
    receiving a detection signal indicating an insertion of a PCI-Express card in a PCI-Express slot of the motherboard;
    determining whether the PCI-Express card is coupled to a SATA-Express device;
    in response to determining that the PCI-Express card is not coupled to a SATA-Express device, maintain a PCI-Express mode on the motherboard, the PCI-Express mode corresponding to a motherboard-level interconnect between integrated peripherals and add-on peripherals of the computing system; and
    in response to determining that the PCI-Express card is coupled to a SATA-Express device, initiate a SATA-Express mode on the motherboard, the SATA-Express mode corresponding to SATA-Express applications with the SATA-Express device.

11. The method of claim 10, wherein the detection signal is received in response to the SATA-Express device being coupled to a mounting bracket of the PCI-Express card.

12. The method of claim 10, wherein the detection signal is received based on one or more PCI-Express slot lanes, specific for the SATA-Express applications with the SATA-Express device, being coupled to one or more corresponding connector pins of the SATA-Express device.

13. The method of claim 12, wherein the detection signal is received from a detection mechanism included on the motherboard and coupled to the one or more PCI-Express slot lanes.

14. The method of claim 12, wherein determining whether the PCI-Express card is coupled to a SATA-Express device is based on whether the one or more PCI-Express slot lanes are coupled to the one or more corresponding connector pins of the SATA-Express device.

* * * * *

UNITED STATES PATENT AND TRADEMARK OFFICE
CERTIFICATE OF CORRECTION

PATENT NO. : 9,141,152 B2
APPLICATION NO. : 13/464354
DATED : September 22, 2015
INVENTOR(S) : Raphael Gay Page 1 of 1

It is certified that error appears in the above-identified patent and that said Letters Patent is hereby corrected as shown below:

On the Title page, in item (75), Inventors, in column 1, line 1, below
"Raphael Gay, Fort Collins, CO (US)" insert -- Linden McClure, Milliken, CO (US) --, therefor.

On the Title page, in item (73), Assignee, in column 1, line 1, delete "Devlopment" and insert
-- Development --, therefor.

Signed and Sealed this
Third Day of May, 2016

Michelle K. Lee
*Director of the United States Patent and Trademark Office*